US 11,604,315 B1

(12) United States Patent
Wheelwright et al.

(10) Patent No.: US 11,604,315 B1
(45) Date of Patent: Mar. 14, 2023

(54) MULTIPLEXING OPTICAL ASSEMBLY WITH A HIGH RESOLUTION INSET

(71) Applicant: Meta Platforms Technologies, LLC, Menlo Park, CA (US)

(72) Inventors: Brian Wheelwright, Sammamish, WA (US); Ying Geng, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 217 days.

(21) Appl. No.: 16/936,280

(22) Filed: Jul. 22, 2020

Related U.S. Application Data

(63) Continuation of application No. 15/839,524, filed on Dec. 12, 2017, now Pat. No. 10,768,371.

(51) Int. Cl.
*G02B 6/293* (2006.01)
*G02B 6/42* (2006.01)

(52) U.S. Cl.
CPC ........... *G02B 6/293* (2013.01); *G02B 6/4214* (2013.01); *G02B 6/4215* (2013.01); *G02B 6/4296* (2013.01)

(58) Field of Classification Search
CPC .... G02B 6/293; G02B 6/4214; G02B 6/4215; G02B 6/4296
See application file for complete search history.

(56) References Cited

U.S. PATENT DOCUMENTS

2017/0214907 A1  7/2017  Lapstun

FOREIGN PATENT DOCUMENTS

WO  WO-2018081636 A1 *  5/2018  ......... G02B 26/0833

* cited by examiner

*Primary Examiner* — Sung H Pak
*Assistant Examiner* — Hoang Q Tran
(74) *Attorney, Agent, or Firm* — Fenwick & West LLP

(57) ABSTRACT

A display assembly presented herein includes an inset display, a peripheral display, and a multiplexing optical assembly (MOA). The inset display has a first resolution and emits image light of a first polarization. The peripheral display has a second resolution and emits image light of a second polarization. The MOA receives the image light of the first polarization and the image light of the second polarization. The MOA then transforms the image light of the first polarization into a first portion of image light of a third polarization, and transforms the image light of the second polarization into a second portion of image light of the third polarization. The MOA directs the first portion of image light and the second portion of image light toward an eye-box. The display assembly can be implemented as a component of a head-mounted display of an artificial reality system.

20 Claims, 9 Drawing Sheets

MULTIPLEXING OPTICAL ASSEMBLY WITH A HIGH RESOLUTION INSET

CROSS REFERENCE TO RELATED APPLICATIONS

This application is a continuation of co-pending U.S. application Ser. No. 15/839,524, filed Dec. 12, 2017, which is incorporated by reference in its entirety.

BACKGROUND

The present disclosure generally relates to displaying content to a user of an artificial reality system, and specifically relates to a multiplexing optical assembly with a high resolution inset display.

Conventional displays present images at a constant resolution. In contrast, resolution varies across a retina of a human eye. Though the eye receives data from a field of about 200 degrees, the acuity over most of that range is poor. In fact, the light must fall on the fovea to form high resolution images, and that limits the acute vision angle to about 15 degrees. In head-mounted displays (HMDs), at any given time, only a small portion of the image light emitted from the display is actually imaged onto the fovea. The remaining image light that is imaged onto retina is imaged at other areas that are not capable of perceiving the high resolution in the emitted image light. Accordingly, some of the resources (e.g., power, memory, processing time, etc.) that went into generating the high resolution image being viewed by the user is wasted as the user is not able to perceive the portion of the image light imaged outside the fovea at its full resolution.

SUMMARY

A display assembly presented herein includes an inset display, a peripheral display, and a multiplexing optical assembly (MOA). The inset display has a first resolution and is configured to emit image light of a first polarization. The peripheral display has a second resolution and is configured to emit image light of a second polarization. In some embodiments, the first resolution of the inset display is higher than the second resolution of the peripheral display. The inset display represents a high resolution display positioned along an optical axis of the MOA. The inset display covers a first narrow field-of-view (FOV) around the optical axis corresponding to a foveal region of an eye. The peripheral display spans throughout a second FOV wider than the first FOV covering a retinal region of the eye outside the fovea. In some embodiments, the inset display is positioned in parallel with the peripheral display. The MOA receives image light of the first polarization emitted from the inset display and image light of the second polarization emitted from the peripheral display. The MOA then transforms the image light of the first polarization into a first portion of image light having a third polarization. The MOA also transforms the image light of the second polarization into a second portion of image light having the third polarization. The MOA directs the first portion of image light and the second portion of image light toward an eye-box where the eye is located.

A head-mounted display (HMD) can further integrate the display assembly. The HMD displays content to a user. The HMD may be part of an artificial reality system. The HMD includes an electronic display and an optical assembly. The electronic display is configured to emit image light. The electronic display may include the inset display and the peripheral display of the display assembly. The optical assembly is configured to direct the image light to an eye-box of the HMD corresponding to a location of a user's eye. The optical assembly may include the MOA of the display assembly.

Figure 1:
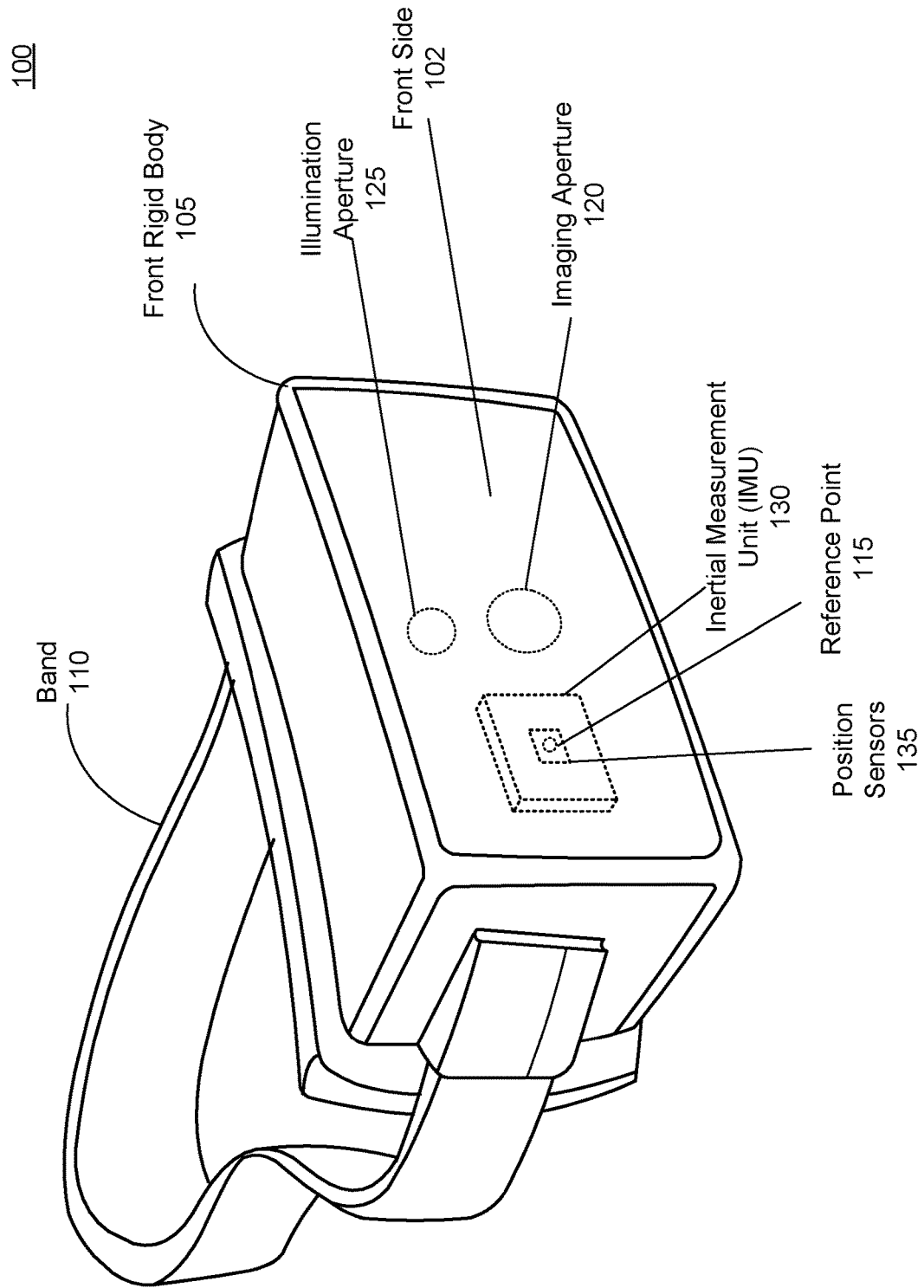
FIG. 1 is a diagram of a head-mounted display (HMD), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a HMD connected to a host computer system, a standalone HMD, a mobile device or computing system, or any other hardware platform capable of providing artificial reality content to one or more viewers.

A display assembly presented herein includes an inset display, a peripheral display, and a multiplexing optical assembly (MOA). The MOA includes two optical elements in optical series that form a pancake lens. The MOA folds light of a first polarization and transmits light of a second polarization (e.g., polarization orthogonal to the first polarization). The inset display is a high resolution display that is positioned along an optical axis of the MOA. The inset display emits image light of the first polarization. The peripheral display has a lower pixel resolution than the inset display, and emits image light at the second polarization such that the image light of the second polarization is not folded by the MOA.

In some embodiments, the display assembly is incorporated into a HMD. The HMD displays content to a user. The HMD may be part of an artificial reality system. The HMD includes an electronic display and an optical assembly. The electronic display is configured to emit image light. The electronic display may include the inset display and the peripheral display of the display assembly. The optical assembly is configured to direct the image light to an eye-box of the HMD corresponding to a location of a user's eye. The optical assembly may include the MOA of the display assembly. The MOA combines image light emitted from the inset display and image light emitted from the peripheral display, and directs the combined light to the eye-box. In this way, a wide field-of-view (FOV) is achieved while high resolution images are provided in a central region of the FOV, i.e., in a foveal region of a retina of the user's eye.

FIG. 1 is a diagram of a HMD 100, in accordance with an embodiment. The HMD 100 may be part of an artificial reality system. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. In some embodiments, the HMD 100 may also include a depth camera assembly (DCA) configured to determine depth information of a local area surrounding some or all of the HMD 100. The HMD 100 may also include an imaging aperture 120 and an illumination aperture 125, and an illumination source of the DCA emits light (e.g., a structured light pattern) through the illumination aperture 125. An imaging device of the DCA captures light from the illumination source that is reflected from the local area through the imaging aperture 120.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates IMU data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
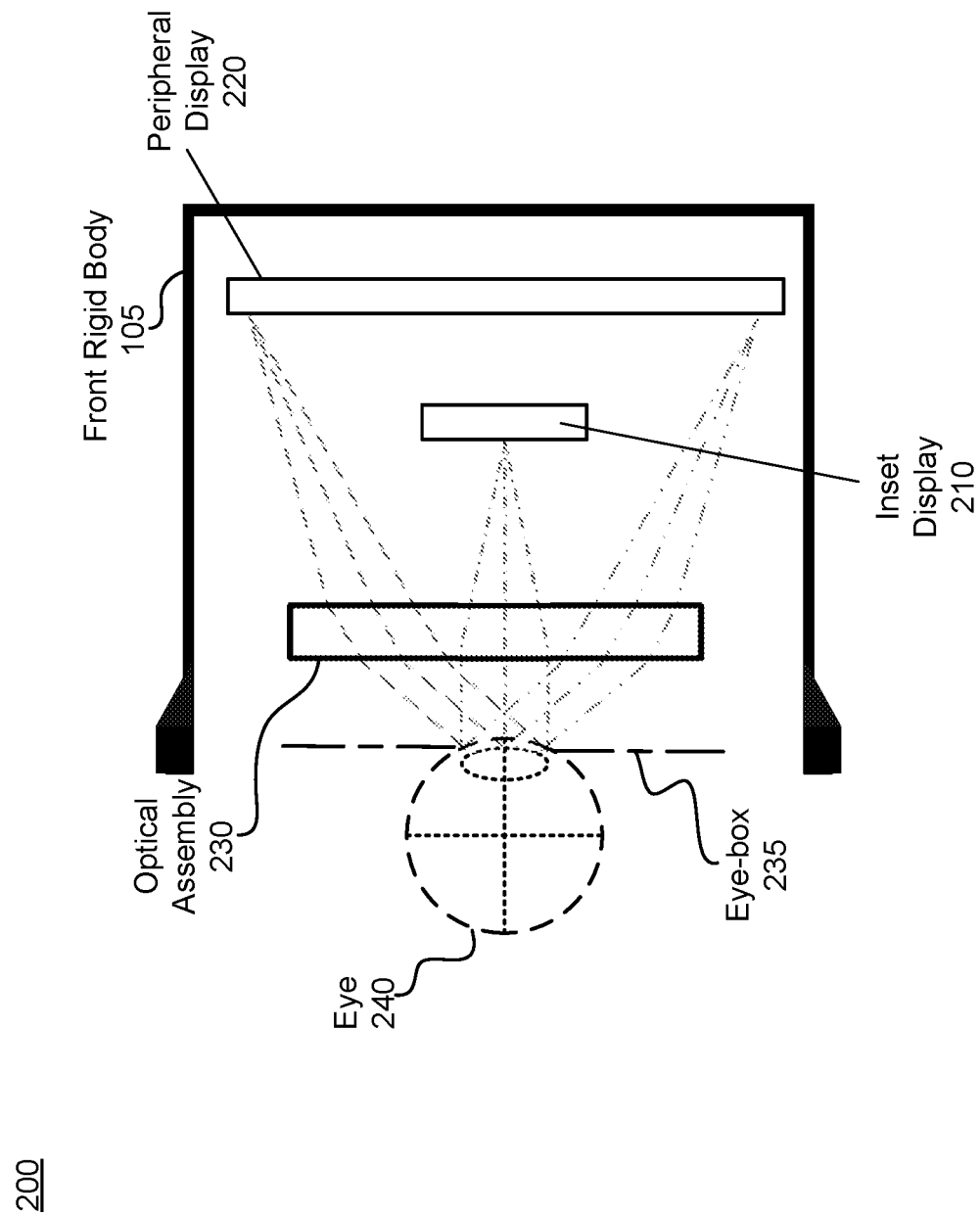
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an inset display 210, a peripheral display 220, and an optical assembly 230 that together provide compound image light to an eye-box 235. The eye-box 235 is a region in space that is occupied by a user's eye 240. For purposes of illustration, FIG. 2 shows a cross section 200 associated with a single eye 240, but another optical assembly 230, separate from the optical assembly 230, provides altered image light to another eye of the user.

The inset display 210 is a high resolution display that emits image light covering a first FOV around a foveal region of the user's eye 240. In some embodiments, the first FOV spans between −10 degrees and +10 degrees. The inset display 210 may emit polarized image light. In some embodiments, the inset display 210 directly generates the polarized image light. Alternatively, the inset display 210 includes a display surface and a polarizer (not shown in FIG. 2). The display surface of the inset display 210 is configured to emit image light, and the polarizer polarizes the image light to form the polarized image light. In some embodiments, the inset display 210 includes an optical element that adjusts the focus of the generated image light. The inset display 210 displays portions of high resolution images to the user in accordance with data received from a console (not shown in FIG. 1). In various embodiments, the inset display 210 may comprise a single electronic display or multiple electronic displays (e.g., a display for each eye of a user). Examples of the inset display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The inset display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, the inset display 210 may have one or more coatings, such as anti-reflective coatings.

The peripheral display 220 is a lower resolution display that emits image light covering a second FOV in a retinal (peripheral) region of the user's eye 240 outside the foveal region. In general, the second FOV is much wider than the first FOV covered by the inset display 215. The peripheral display 220 may generate image light having polarization different than polarization of the image light emitted from the inset display 210. In some embodiments, the peripheral display 220 includes an optical element that adjusts the focus of the generated image light. The peripheral display 220 displays portions of lower resolution images to the user in accordance with data received from the console. In various embodiments, the peripheral display 220 may comprise a single electronic display or multiple electronic displays (e.g., a display for each eye of a user). Examples of the peripheral display 220 include: a LCD, an OLED display, an ILED display, an AMOLED display, a TOLED display, some other display, a projector, or some combination thereof. The peripheral display 220 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, the peripheral display 220 may have one or more coatings, such as anti-reflective coatings.

The optical assembly 230 receives image light from the inset display 210 and the peripheral display 220, combines (multiplexes) the received image light and directs the combined image light to the eye-box 235 of the user's eye 240. The optical assembly 230 also magnifies the received image light, corrects optical aberrations associated with the image light, and the corrected image light is presented to a user of the HMD 100. At least one optical element of the optical assembly 230 may be an aperture, a Fresnel lens, a refractive lens, a reflective surface, a diffractive element, a waveguide, a filter, or any other suitable optical element that affects image light emitted from the inset display 210 and image light emitted from the peripheral display 220. Moreover, the optical assembly 230 may include combinations of different optical elements. In some embodiments, one or more of the optical elements in the optical assembly 230 may have one or more coatings, such as anti-reflective coatings, dichroic coatings, etc. Magnification of the image light by the optical assembly 230 allows elements of the inset display 210 and the peripheral display 220 to be physically smaller, weigh less, and consume less power than larger displays. Additionally, magnification may increase a FOV of the displayed media. For example, the FOV of the displayed media is such that the displayed media is presented using almost all (e.g., 110 degrees diagonal), and in some cases all, of the user's FOV. In some embodiments, the optical assembly 230 is designed so its effective focal length is larger than the spacing to the peripheral display 220, which magnifies the image light projected by the peripheral display 220. Additionally, in some embodiments, the amount of magnification may be adjusted by adding or removing optical elements. More details about embodiments of the inset display 210, the peripheral display 220 and the optical assembly 230 are described in conjunction with FIG. 3 and FIG. 4.

In some embodiments, the front rigid body 105 further comprises an eye tracking system (not shown in FIG. 1) that determines eye tracking information for the user's eye 240. The determined eye tracking information may comprise information about a position (including orientation) of the user's eye 240 in the eye-box 235, i.e., information about an angle of an eye-gaze. In one embodiment, the eye tracking system illuminates the user's eye 240 with structured light. The eye tracking system can use locations of the reflected structured light in a captured image to determine the position of the user's eye 240. In another embodiment, the eye tracking system determines the position of the user's eye 240 based on magnitudes of image light captured over a plurality of time instants.

In some embodiments, the front rigid body 105 further comprises a varifocal module (not shown in FIG. 2). The varifocal module may adjust focus of one or more images displayed on the inset display 210 and/or the peripheral display 220, based on the eye tracking information obtained from the eye tracking system. In one embodiment, the varifocal module adjusts focus of the displayed images and mitigates vergence-accommodation conflict by adjusting a focal distance of the optical assembly 230 based on the determined eye tracking information. In another embodiment, the varifocal module adjusts focus of the displayed images by performing foveated rendering of the one or more images based on the determined eye tracking information.

Figure 3:
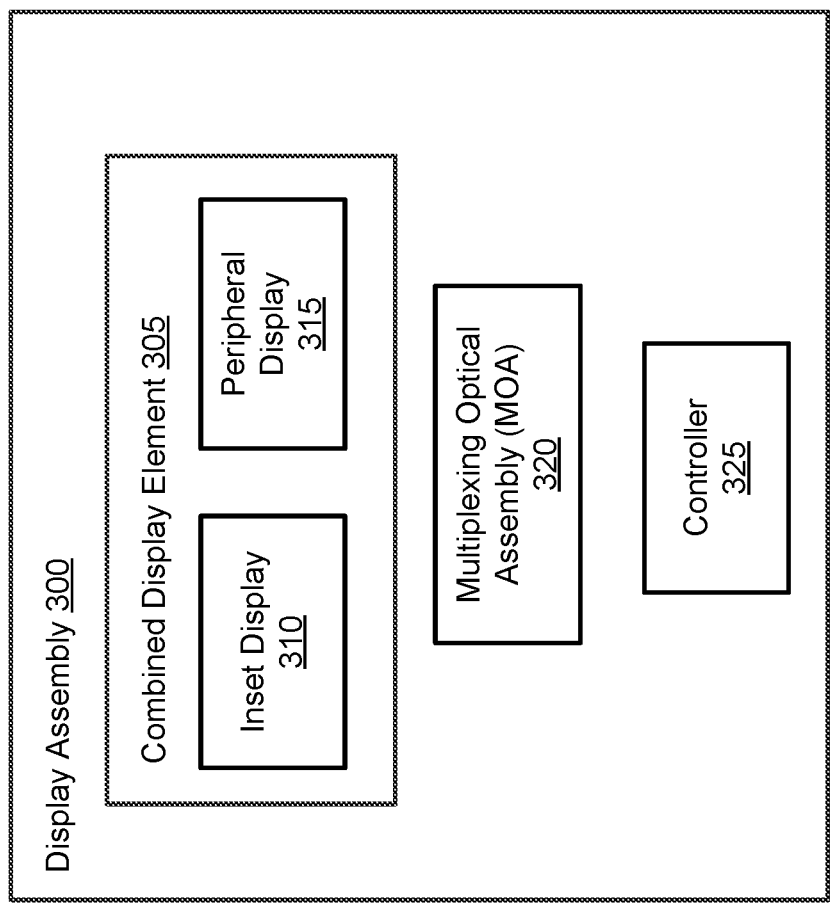
FIG. 3 is a block diagram illustrating a detailed view of modules within a display assembly, which may be part of the HMD in FIG. 1, in accordance with an embodiment.

FIG. 3 is a high-level block diagram illustrating a detailed view of modules within a display assembly 300, in accordance with an embodiment. In some embodiments, the display assembly 300 is a component of the front rigid body 205 of the HMD 100. In alternate embodiments, the display assembly 300 is part of some other HMD, or other system that generates images at high resolution around a center of a wide FOV (optical axis).

The display assembly 300 includes a combined display element 305 that further includes at least one high inset display 310 and at least one lower resolution peripheral display 315, a MOA 320, and a controller 325. The configuration and operation of the inset display 310, the peripheral display 315, and the MOA 320 are similar to the inset display 215, the peripheral display 220, and the optical assembly 230 of the front rigid body 105 of FIG. 2, respectively.

The display assembly 300 displays composite content to the user, e.g., in accordance with data received from a console (not shown in FIG. 3). Composite content includes an inset region and a peripheral (or background) region. The inset region includes a high resolution inset portion of an image. For example, the high resolution inset portion has resolution corresponding to a resolution of a fovea region of a human eye. The peripheral region has a resolution corresponding to a non-fovea region of a human eye. In various embodiments, the display assembly 300 may comprise at least two electronic displays for each eye of a user, for example the inset display 310 and the peripheral display 315. Examples of the electronic displays include: a LCD, an OLED display, an AMOLED display, some other display, or some combination thereof.

The inset display 310 displays the inset region portion of the composite content. The inset display 310 has at least a resolution capable of displaying the high resolution inset portion of the image at its full resolution. In one embodiment, an optic of the inset display 310 features an effective focal length (EFL) of approximately 20 mm; a pixel pitch of a display surface of the inset display 310 is approximately 12 μm; and an instantaneous FOV (spatial resolution) is approximately 2.0 arcminute. In some embodiments, along the periphery of the inset region, the inset display 310 displays a transitional portion of the image with a varying resolution. In other embodiments, peripheral display 315 displays the transitional portion of the image. In yet other embodiments, the transitional portion of the image is displayed on both the inset display 310 and the peripheral display 315. The inset display 310 receives image data associated with the inset portion from the controller 325. The inset display 310 emits image light of a first polarization that is folded by the MOA 320. In some embodiments, the image light of the first polarization include circularly polarized light of a first handedness, e.g., right handed circularly polarized light.

The peripheral display 315 displays the peripheral region portion of the composite content. The peripheral display 315 receives image data associated with the peripheral region from the controller 325. In some embodiments, the peripheral display 315 may support displaying only low resolution content (e.g., it may be relatively low resolution display). In some embodiments, the peripheral display 315 may support displaying content at high resolution as well as low resolution content. In one embodiment, an optic of the peripheral display 310 features an EFL of approximately 40 mm; a pixel pitch of a display surface of the peripheral display 315 is approximately 55 μm; and an instantaneous FOV (spatial resolution) is approximately 4.3 arcminute. The peripheral display 315 emits image light at a second polarization, such that the image light of the second polarization is not folded by the MOA 320. In some embodiments, the image light of the second polarization include circularly polarized light of a second handedness opposite to the first handedness, e.g., left handed circularly polarized light.

In some embodiments, the optical properties of the inset display 310 and the peripheral display 315 are "well matched." For example, a virtual image distance of the inset display 310 and the peripheral display 310 are within a threshold distance from each other. The threshold distance may be determined by an amount of dioptric separation. The inset display 310 and the peripheral display 315 are also well matched in the sense that one or more aberrations (e.g., field curvature, astigmatism, longitudinal chromatic aberration, etc.) for both displays are within a threshold amount. If the inset display 310 and the peripheral display 315 are not well matched, it may impede matching the virtual image distance for the inset display 310 and the peripheral display 315 when the inset display 310 is steered over the FOV.

In some embodiments, the display assembly 300 is configured to generate composite content having a fixed inset region. A fixed inset region is an inset region that is fixed in relation to the peripheral region. The fixed inset region does not change its location with the movement of the eye. In some embodiments, the fixed inset region is located in an inset area located in a center of the FOV, i.e., around an optical axis of the MOA 320. In other embodiments, the fixed inset region is located at some other location (e.g., may be off-center). In these embodiments, the MOA 320 may also include an optical anti-aliasing filter. The optical anti-aliasing filter is an optical element that optically blurs the peripheral region of the composite content. This helps remove digital artifacts due to the nature of the display and make the blur of the peripheral region more natural.

The MOA 320 combines (multiplexes) the content from the inset display 310 and the peripheral display 315 to form a composite content at retinal resolution, i.e., at a high resolution in a foveal region of the retina and at a lower resolution in the retinal region outside the fovea. The MOA 320 may include a pair of optical elements in optical series that form a pancake lens. The pancake lens of the MOA 320 may transform image light of the first polarization emitted from the inset display 310 into a first portion of image light having a third polarization by folding the image light of the first polarization. The pancake lens of the MOA 320 may further transform the image light of the second polarization emitted from the peripheral display 315 into a second portion of image light having the third polarization by directly transmitting (without folding) the image light of the second polarization. The MOA combines (multiplexes) the first portion of image light related to the high resolution inset region and the second portion of image light related to the lower resolution peripheral region into composite content. The MOA 320 directs the composite content towards an eye-box of the display assembly 300. More details about a structure and operation of the MOA 320 are described in conjunction with FIG. 4.

In some embodiments, the controller 325 divides an image (or series of images) into a high resolution inset portion and a peripheral portion (lower resolution portion). Alternatively, the controller 325 divides an image (or series of images) into a high resolution inset portion, a transitional portion, and a peripheral portion. In some embodiments, the controller 325 adjusts the resolution (e.g., upsample or downsample) of the high resolution inset portion such that it corresponds to a target resolution of an inset region. The target resolution is a resolution corresponding to a fovea region of a human eye. In some embodiments, the target resolution may be a resolution of the inset display 310. In some embodiments, the resolution of the high resolution inset portion is at the resolution of the inset display 310 so no adjustment is needed. The resulting content corresponds to the inset region of the composite content. Likewise, in some embodiments, the controller 325 adjusts (e.g., downsamples) the resolution of the peripheral portion such that it corresponds to the resolution of a background region of the composite content (e.g., may be a resolution of the peripheral display 315). The resulting content corresponds to the background region of the composite content.

In some embodiments, the controller 325 applies a blending function to adjust the resolution of transitional portion such that the resolution smoothly transitions from a resolution of the high resolution inset portion of the image to the resolution of the peripheral region. The blending function corresponds to the fall off in acuity associated with a transition from a fovea to a non-fovea region of a human eye. The blending function may be, for example, a Gaussian pyramid decomposition function, a Gaussian blending function, some function that smoothly transitions from the resolution of the inset region to the resolution of the peripheral region, or some combination thereof. Additionally, the pyramid blending function may include performing a Gaussian pyramid decomposition, i.e., smoothen the content with an appropriate smoothing filter and then subsample the smoothed content and continue the process for a predetermined level of sampling density. The sub sampled and smoothened content is blended to the original content using a Gaussian blending function. The blended transitional portion corresponds to the transitional region of the composite content.

The controller 325 may also fade (e.g. the light is reduced in the section of the resulting image) the peripheral portion and/or the transitional portion using an intensity fading function. The content may include regions that have variable amounts of fading. Each region is termed as a fading region. The boundary of a fading region is determined using a size of the inset region. In some embodiments, the intensity fading function is applied to the image that causes an inset area in the background region to fade to black. And similarly, a different intensity fading function may be applied to some of the transitional portion of the image that surrounds the high resolution inset portion of the image.

The controller 325 provides, for display, the inset region to the inset display 310. The controller 325 also provides, for display, the peripheral region to the peripheral display 315.

Figure 4:
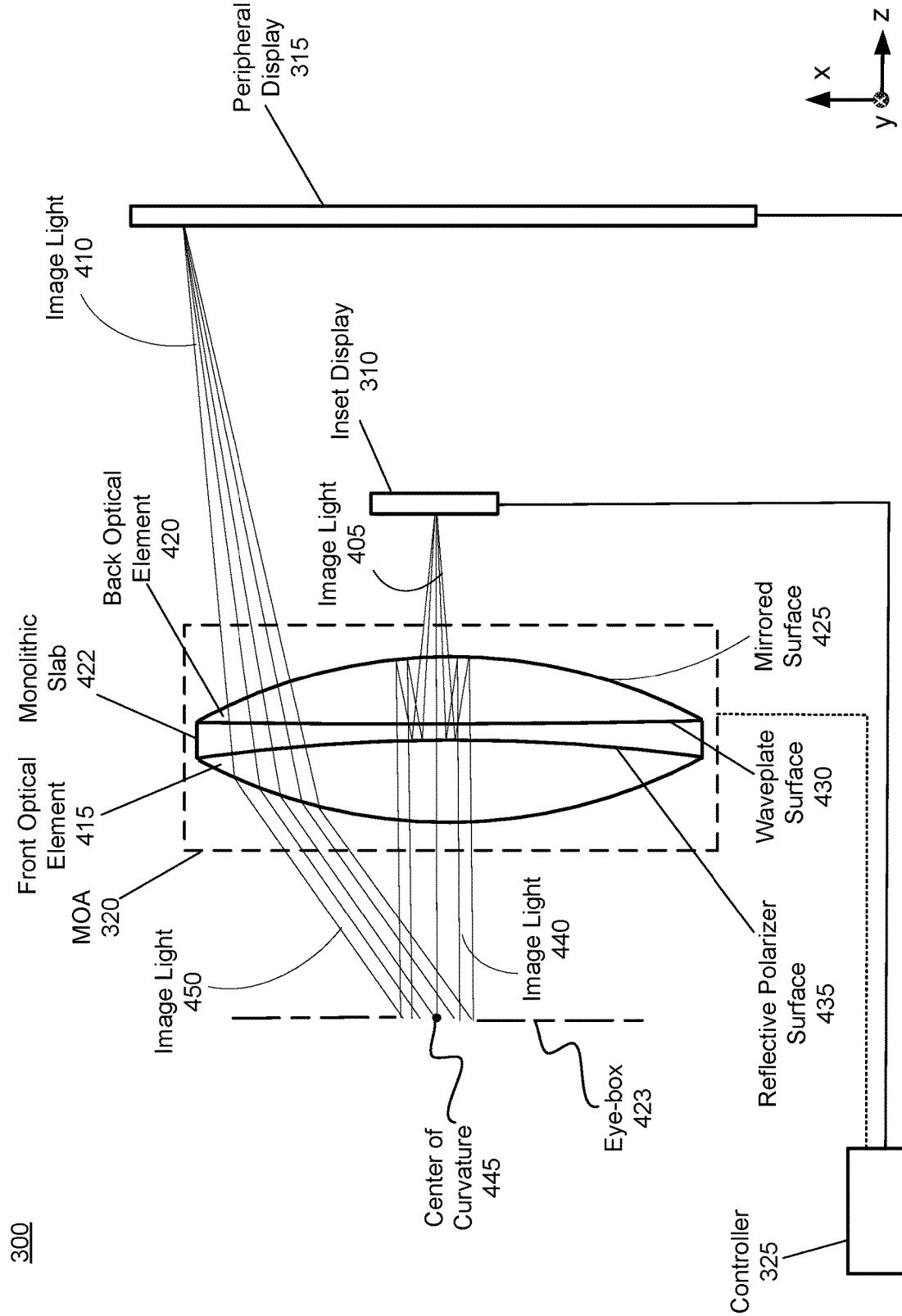
FIG. 4 is a detailed view of cross section of the display assembly of FIG. 3 including an inset display, a peripheral display and a multiplexing optical assembly, in accordance with an embodiment.

FIG. 4 shows a detailed view of cross section of the display assembly 300 of FIG. 3 including the inset display 310, the peripheral display 315, the MOA 320 and the controller 325, in accordance with an embodiment. The inset display 310 having a first resolution emits image light 405 of a first polarization. In some embodiments, the image light 405 includes circularly polarized light of a first handedness, e.g., the image light 405 is right handed circularly polarized light. In one embodiment, the inset display 310 directly emits the image light 405 as circularly polarized light. Alternatively, the inset display 310 includes a display surface and a circular polarizer (not shown in FIG. 4), and the display surface is configured to emit image light, and the circular polarizer polarizes the image light to form the image light 405 of the first polarization. The controller 325 is coupled to the inset display 310 and the peripheral display 315, and the controller 325 controls operations of the inset display 310 and the peripheral display 315 as discussed in conjunction with FIG. 3. In some embodiments (not shown in FIG. 4), the controller 325 drives the inset display 310 and the peripheral display 315 via a wired connection that goes from the controller 325 to the inset display 310 through a hole in the peripheral display 315.

The peripheral display 315 having a second resolution different than the first resolution of the inset display 310 emits image light 410 of a second polarization different than the first polarization. In some embodiments, the second resolution of the peripheral display 315 is lower than the first resolution of the inset display 310. In some embodiments, the image light 410 includes circularly polarized light of a second handedness opposite to the first handedness, e.g., the image light 410 is left handed circularly polarized light. In one embodiment, the peripheral display 315 directly emits the image light 410 as circularly polarized light. Alternatively, the peripheral display 315 includes a display surface and a circular polarizer (not shown in FIG. 4), and the display surface is configured to emit image light, and the circular polarizer polarizes the image light to form the image light 410 of the second polarization.

As shown in FIG. 4, the MOA 320 is implemented as a pancake lens assembly that includes a front optical element 415 in optical series with a back optical element 420, wherein the front optical element 415 is positioned closer to an eye-box 423. One or more surfaces of the front optical element 415 and the back optical element 420 are shaped to correct for field curvature. One or more surfaces of the front optical element 415 may be shaped to be spherically concave (e.g., a portion of a sphere), spherically convex, a rotationally symmetric sphere, a freeform shape, or some other shape that mitigates field curvature. In some embodiments, the shape of one or more surfaces of the front optical element 415 and the back optical element 420 are designed to additionally correct for other forms of optical aberration. In some embodiments, at least one of the front optical element 415 and the back optical element 420 within the MOA 320 may have one or more coatings, such as anti-reflective coatings, e.g., to reduce ghost images and enhance contrast.

In some embodiments, the front optical element 415 and the back optical element 420 are separate lenses with an air gap between the front optical element 415 and the back optical element 420. In one or more embodiments, the controller 325 is coupled to the MOA 320, i.e., to at least one of the front optical element 415 and the back optical element 420. For example, the controller 325 may be coupled to the front optical element 415 and/or the back optical element 420 via one or more micro-actuators (positioners), not shown in FIG. 4. The controller 325 may move the front optical element 415 and/or the back optical element 420 (e.g., along z axis) via the one or more micro-actuators, based in part on instructions from the controller 325. In this manner, the controller 325 may dynamically adjust the air gap between the front optical element 415 and the back optical element 420 in order to change a virtual image distance. Thus, the MOA 320 having the front optical element 415 and the back optical element 420 coupled to the controller 325 may operate as a varifocal optical assembly. In other embodiments, the front optical element 415 and the back optical element 420 are bonded into a monolithic assembly. As shown in FIG. 4, a monolithic slab 422 may bond the front optical element 415 and the back optical element 420 without any air gap between the front optical element 415 and the back optical element 420. In yet other embodiments, inset display 310 may be actuated along an optical axis of the MOA 320, e.g., along z dimension, in order to change a virtual image distance, providing varifocal capability to the display assembly 300.

In one embodiment illustrated in FIG. 4, the back optical element 420 includes a mirrored surface 425 and a waveplate surface 430. The mirrored surface 425 is partially reflective to reflect a portion of light incident on the mirrored surface 425. In some embodiments, the mirrored surface 425 is configured to transmit approximately 50% of the incident light and reflect approximately 50% of the incident light. In some embodiments, the waveplate surface 430 is a quarter-waveplate that shifts polarization of received light. A quarter-waveplate converts circularly polarized light into linearly polarized light. Likewise, a quarter-waveplate can convert linearly polarized light incident to the quarter-waveplate into circularly polarized light. Quarter-waveplates can be made of birefringent materials such as quartz, organic material sheets, or liquid crystal.

In the embodiment shown in FIG. 4, the front optical element 415 includes a reflective polarizer surface 435. The reflective polarizer surface 435 is a partially reflective mirror configured to reflect received light of a first linear polarization orthogonal to a transmission axis of the front optical element 415. The reflective polarizer surface 435 is also configured to transmit received light of a second linear polarization parallel to the transmission axis of the front optical element 415. For example, the reflective polarizer surface 435 may be configured to reflect linearly polarized light with a polarization direction in the y direction, and pass light that is linearly polarized in the x direction. In some embodiments, the reflective polarizer surface 435 has a polarization transmission contrast ratio greater than 100 to 1, e.g., 200:1 or 500:1.

FIG. 4 further shows propagation of light in the display assembly 300 that includes the inset display 310, the peripheral display 315 and the MOA 320, in accordance with an embodiment. A first portion of the image light 405 emitted from the inset display 310 is reflected by the mirrored surface 425 of the back optical element 420, and a second portion of the image light 405 is transmitted by the mirrored surface 425 towards the waveplate surface 430. In some embodiments, the mirrored surface 425 is configured to reflect approximately 50% of incident light (e.g., the image light 405). The waveplate surface 430 (quarter-waveplate) has an axis 45 degrees (or 90 degrees) relative to the x direction. The orientation of the waveplate axis relative to the incident circularly polarized light controls the polarization direction of the emitted linearly polarized light. Similarly, the orientation of the waveplate axis relative to the incident linearly polarized light controls the handedness of the emitted circularly polarized light. The waveplate surface 430 changes polarization of the incident image light 405 from circular polarization to linear polarization.

The linearly polarized image light 405 is incident on the reflective polarizer surface 435 of the front optical element 415, which reflects light that is polarized in a blocking direction (e.g., y direction) and transmits light that is polarized in a perpendicular direction (e.g., x direction). At this point, the linearly polarized image light 405 is linearly polarized in the blocking direction. Thus, the reflective polarizer surface 435 reflects the linearly polarized image light 405. The waveplate surface 430 changes the reflected linearly polarized image light 405 back to the circularly polarized image light 405 having a handedness identical to an initial handedness of the image light 405 emitted from the inset display 310. The mirrored surface 425 reflects a portion of the circularly polarized image light 405, as described above.

The reflected portion of the circularly polarized image light 405 is also circularly polarized; however, its handedness is opposite to the initial handedness of the image light 405 due to the reflection from the mirrored surface 425. Thus, the waveplate surface 430 changes the polarization of the reflected portion of the circularly polarized image light 405 to linearly polarized image light 440. However, as the handedness of the reflected portion of the circularly polarized image light 405 is opposite to the initial handedness of the image light 405 emitted from the inset display 310, the image light 440 is linearly polarized in a direction (e.g., x) perpendicular to the blocking direction (e.g., y) and is therefore transmitted by the reflective polarizer surface 435 to the eye-box 423. The linearly polarized light 440 may propagate through a center of curvature 445 before reaching at least one surface of an eye, e.g., a foveal region of the eye (not shown in FIG. 4).

A first portion of the image light 410 emitted from the peripheral display 315 is reflected by the mirrored surface 425, and a second portion of the image light 410 is transmitted by the mirrored surface 425 towards the waveplate surface 430. The waveplate surface 430 changes polarization of the incident image light 410 from circular polarization to linear polarization. As a handedness of the circularly polarized image light 410 is opposite to the initial handedness of the circularly polarized image light 405, the waveplate surface 430 transforms the image light 410 into image light that is linearly polarized in a direction (e.g., x) perpendicular to the blocking direction (e.g., y) and is therefore transmitted by the reflective polarizer surface 435 to the eye-box 423 as image light 450. The linearly polarized image light 450 may propagate through the center of curvature 445 before reaching at least one surface of the eye, e.g., a retinal region outside of the fovea of the eye (not shown in FIG. 4). Therefore, the MOA 320 combines (multiplexes) the image light 405, 410 of different polarization emitted from different resolution displays into image light of a linear polarization. The higher resolution linearly polarized image light 440 may illuminate the foveal region of the eye and the lower resolution linearly polarized image light 450 may illuminate the retinal region outside the fovea, thus achieving desired resolutions in each portion of the eye.

Figure 4A:
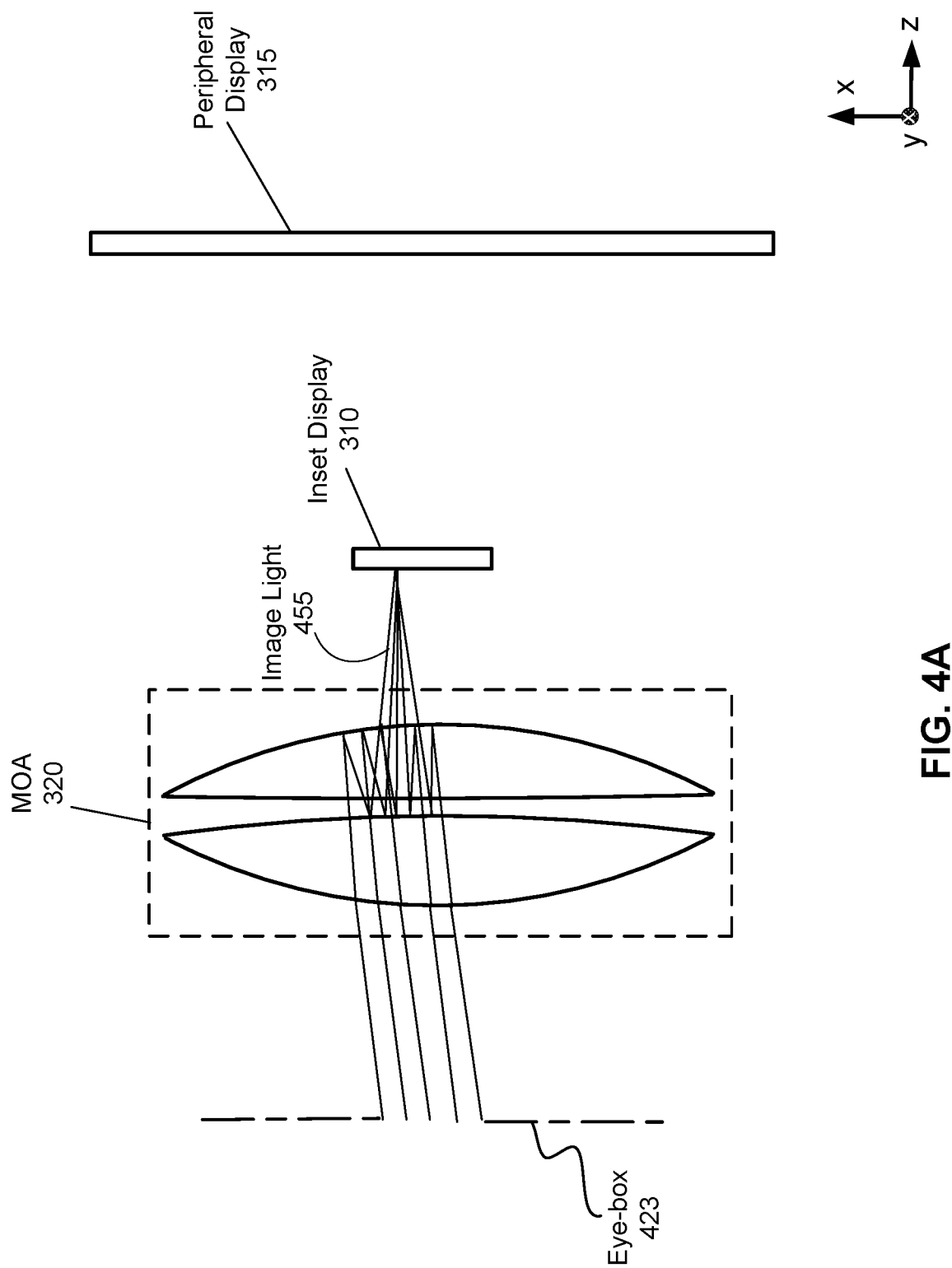
FIG. 4A shows propagation of image light emitted from an inset display, in accordance with an embodiment.

FIG. 4A shows an example propagation of image light 455 emitted from the inset display 310, in accordance with an embodiment. FIG. 4A shows propagation of the image light 455 through components of the MOA 320 for a particular field angle toward the eye-box 423. Note that the inset display 310 may instantaneously cover one or more field angles. Typically, the inset display 310 covers a FOV between approximately −10 degrees and +10 degrees.

Figure 4B:
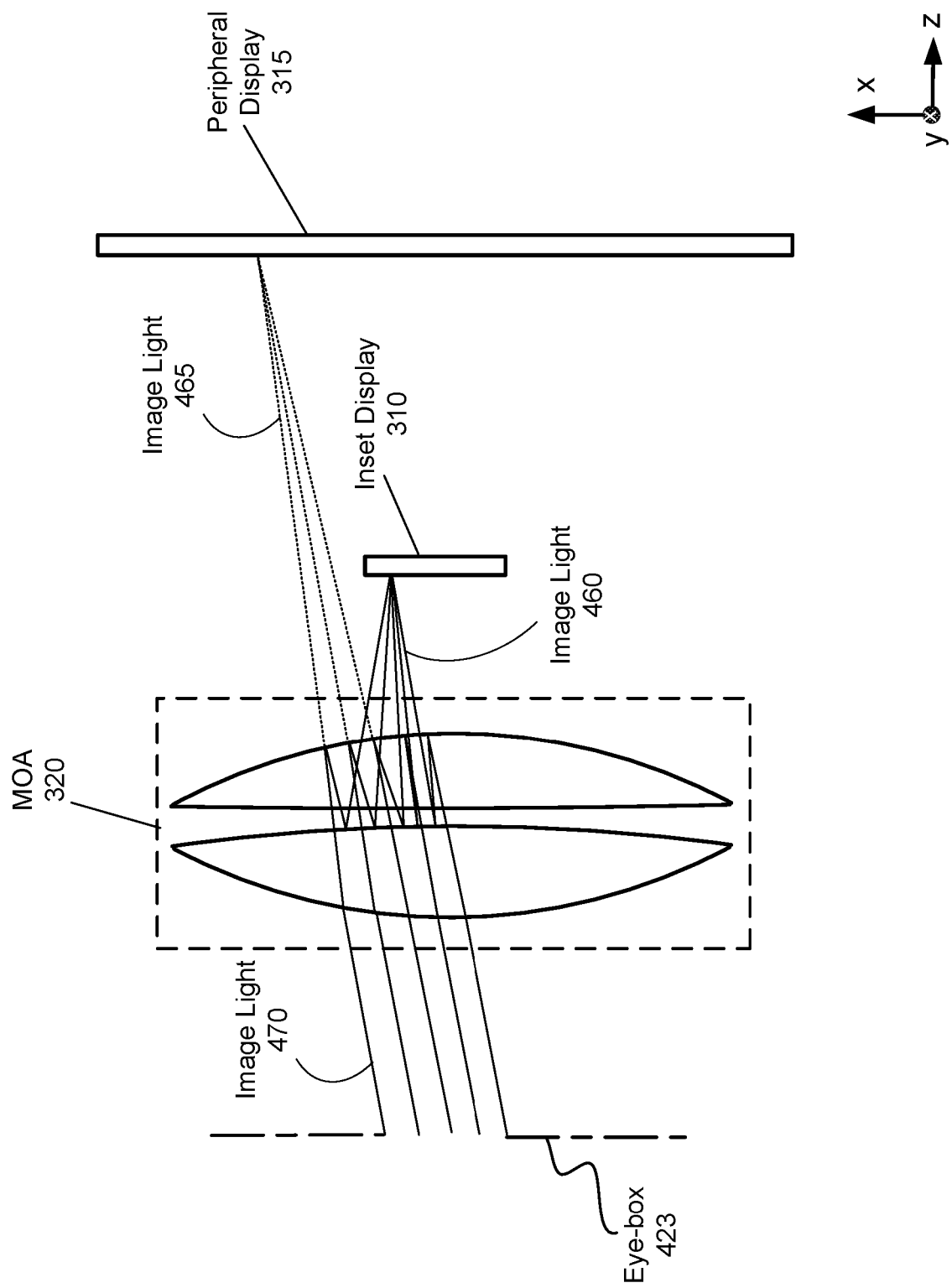
FIG. 4B shows superposition of display paths from an inset display and a peripheral display, in accordance with an embodiment.

FIG. 4B shows an example superposition of display paths from the inset display 310 and the peripheral display 315, in accordance with an embodiment. Image light 460 of a first polarization is emitted from a particular field angle of the inset display 310, and image light 465 of a second polarization is emitted from the same field angle of the peripheral display 315. After propagating through components of the MOA 320, as discussed in conjunction with FIG. 4, the image light 460 and the image light 465 of different polarizations are superimposed into image light 470 of a single polarization directed to the eye-box 423.

Figure 4C:
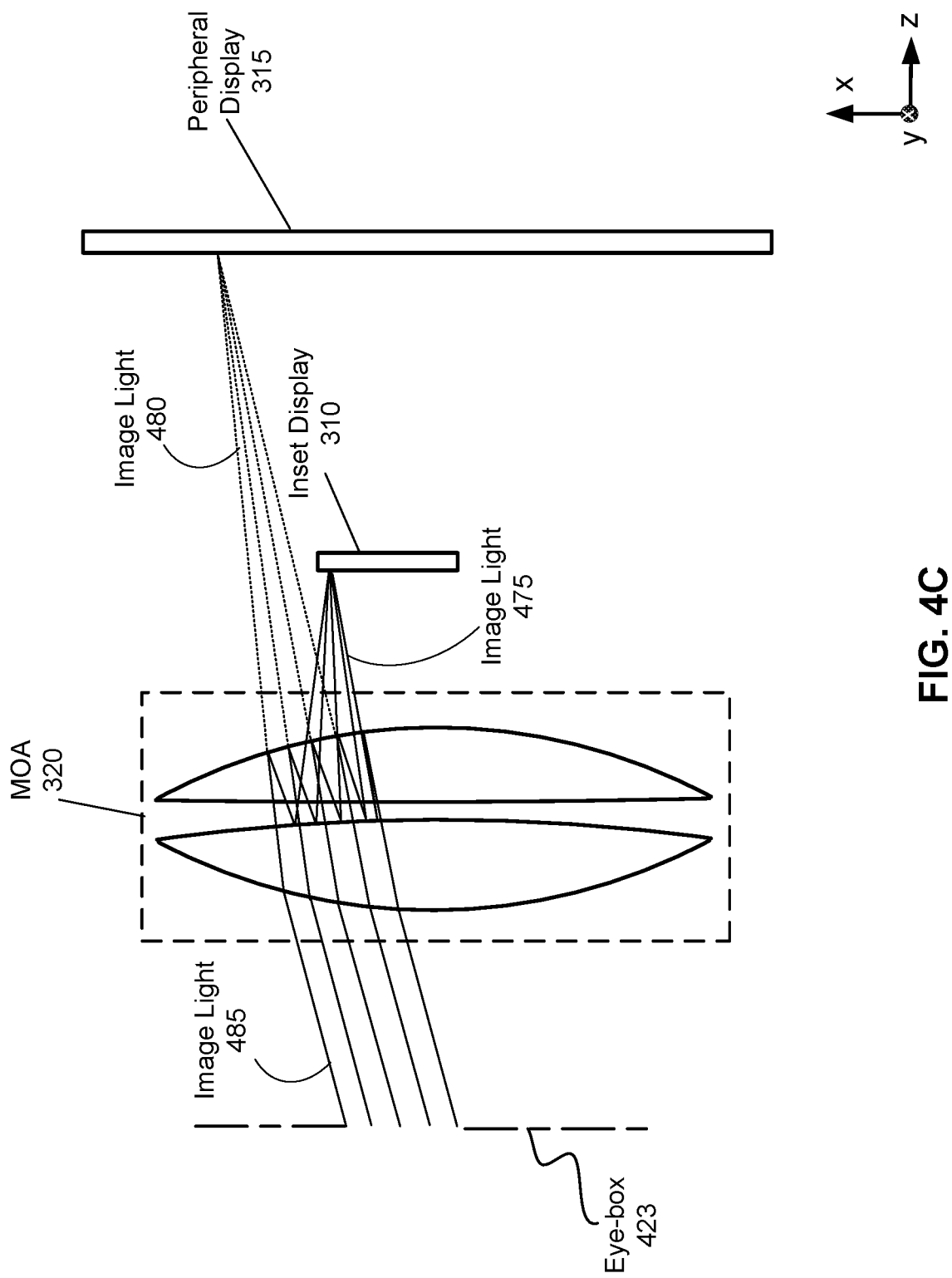
FIG. 4C shows superposition of display paths from the inset display and the peripheral display for a field angle larger than that in FIG. 4B, in accordance with an embodiment.

FIG. 4C shows another example superposition of display paths from the inset display 310 and the peripheral display 315 for a field angle larger than that in FIG. 4B, in accordance with an embodiment. Image light 475 of a first polarization and image light 480 of a second polarization is emitted from a larger field angle of the inset display 310 than the image light 460 and the image light 465. After propagating through components of the MOA 320, as discussed in conjunction with FIG. 4, the image light 475 and the image light 480 are superimposed into image light 485 of a single polarization directed to the eye-box 423. It should be noted that the peripheral display 315 may be fully visible. In some embodiments, the inset display 310 is vignettes away from the peripheral display 315.

Figure 5:
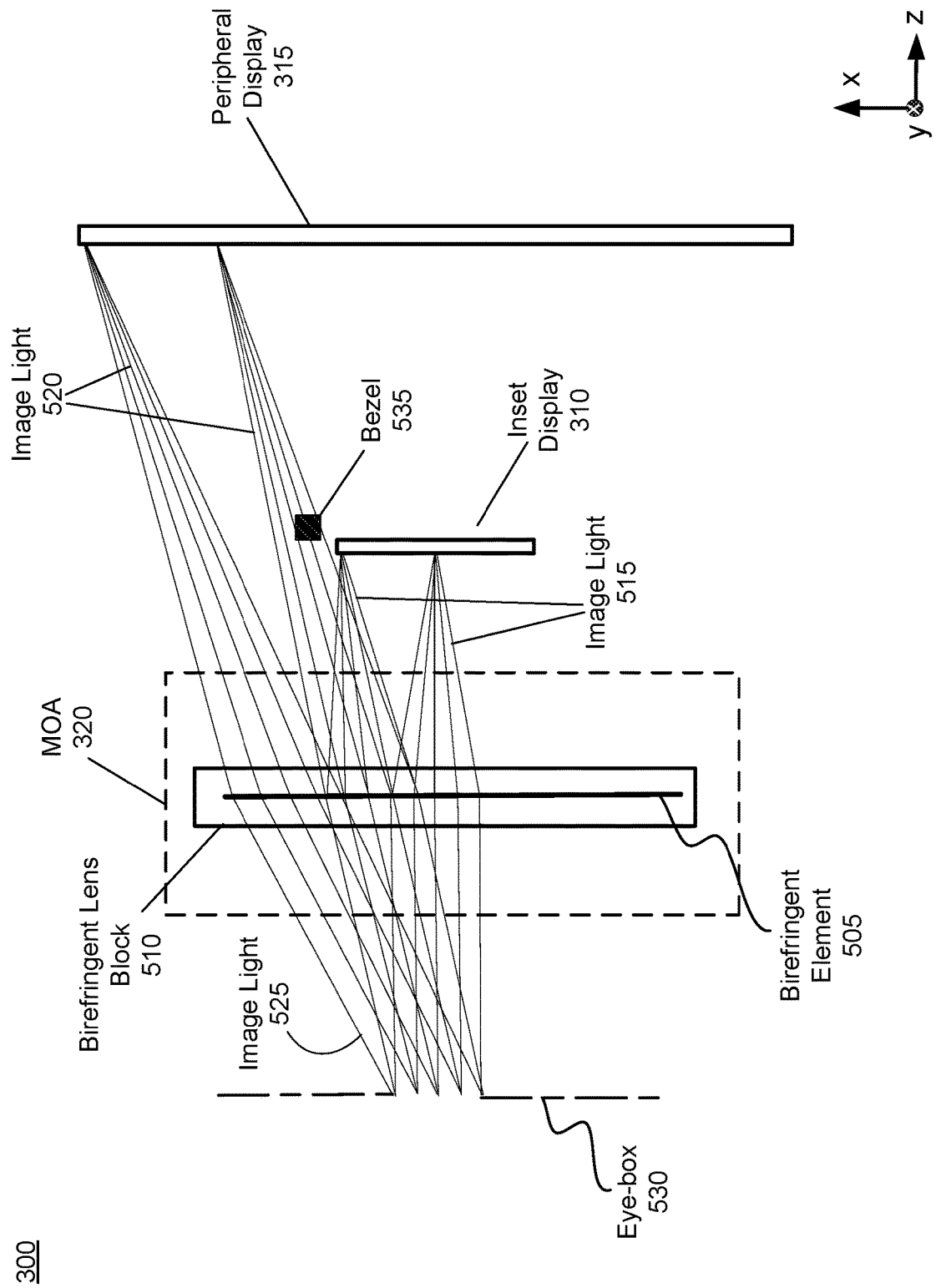
FIG. 5 is a detailed view of cross section of the display assembly of FIG. 3 having a multiplexing optical assembly based on at least one birefringent lens, in accordance with an embodiment.

FIG. 5 is a detailed view of cross section of the display assembly 300 of FIG. 3 having the MOA 320 based on at least one birefringent element (lens), in accordance with an embodiment. As shown in FIG. 5, the MOA 320 utilizes at least one birefringent element 505 in a stack within a birefringent lens block 510. The birefringent element 505 can be made of crystal, plastics, liquid crystals, etc. In an embodiment, the birefringent element 505 may be implemented as a birefringent Fresnel lens. The birefringent element 505 may be implemented to have a first focal length for a first polarization associated with image light 515, and a second focal length longer than the first focal length for a second polarization orthogonal to the first polarization associated with image light 520. The birefringent lens block 510 having the at least one birefringent element 505 superimposes the image light 515 of the first polarization emitted from the inset display 310 and the image light 520 of the second polarization emitted from the peripheral display 315 into image light 525 of a single polarization directed to an eye-box 530.

Note that a size of a bezel 535 of the inset display 310 can be designed to be small enough such that the bezel 535 would not shadow the image light 520 being at the same field of view as the image light 515 emitted from an edge of the inset display 310. In some embodiments, a portion of the peripheral display 315 positioned behind the inset display 310 is not being used. The peripheral display 315 may be implemented as a custom display having a hole in a center of the peripheral display 315 (not shown in FIG. 5). The hole in the center of the peripheral display 315 may allow connection wires of a driving interface (not shown in FIG. 5) to go through the peripheral display 315 and couple the peripheral display 315 with the inset display 310.

In alternative embodiments, instead of the at least one birefringent element 505, the MOA 320 may include at least one geometric phase lens or at least one Pancharatnam-Berry phase lens (not shown in FIG. 5). The geometric phase lens of the MOA 320 (or the Pancharatnam-Berry phase lens) may be implemented to have a focal length of f for image light of a first polarization (e.g., left handed circularly polarized light), and a focal length of −f for image light of a second polarization (e.g., right handed circularly polarized light). In some embodiments, the geometric phase lens can be combined with other elements within the MOA 320 having a focal length of $f_0$. Thus, the combined focal length for the MOA 320 having the geometric phase lens would be ($f_0$+f) for the image light of the first polarization (e.g., left handed circularly polarized light), and ($f_0$−f) for the image light of the second polarization (e.g., right handed circularly polarized light). The rest of the system functions similarly as what is described above for the system based on the at least one birefringent element 505 of FIG. 5 and the system based on a pancake lens of FIG. 4.

System Environment

Figure 6:
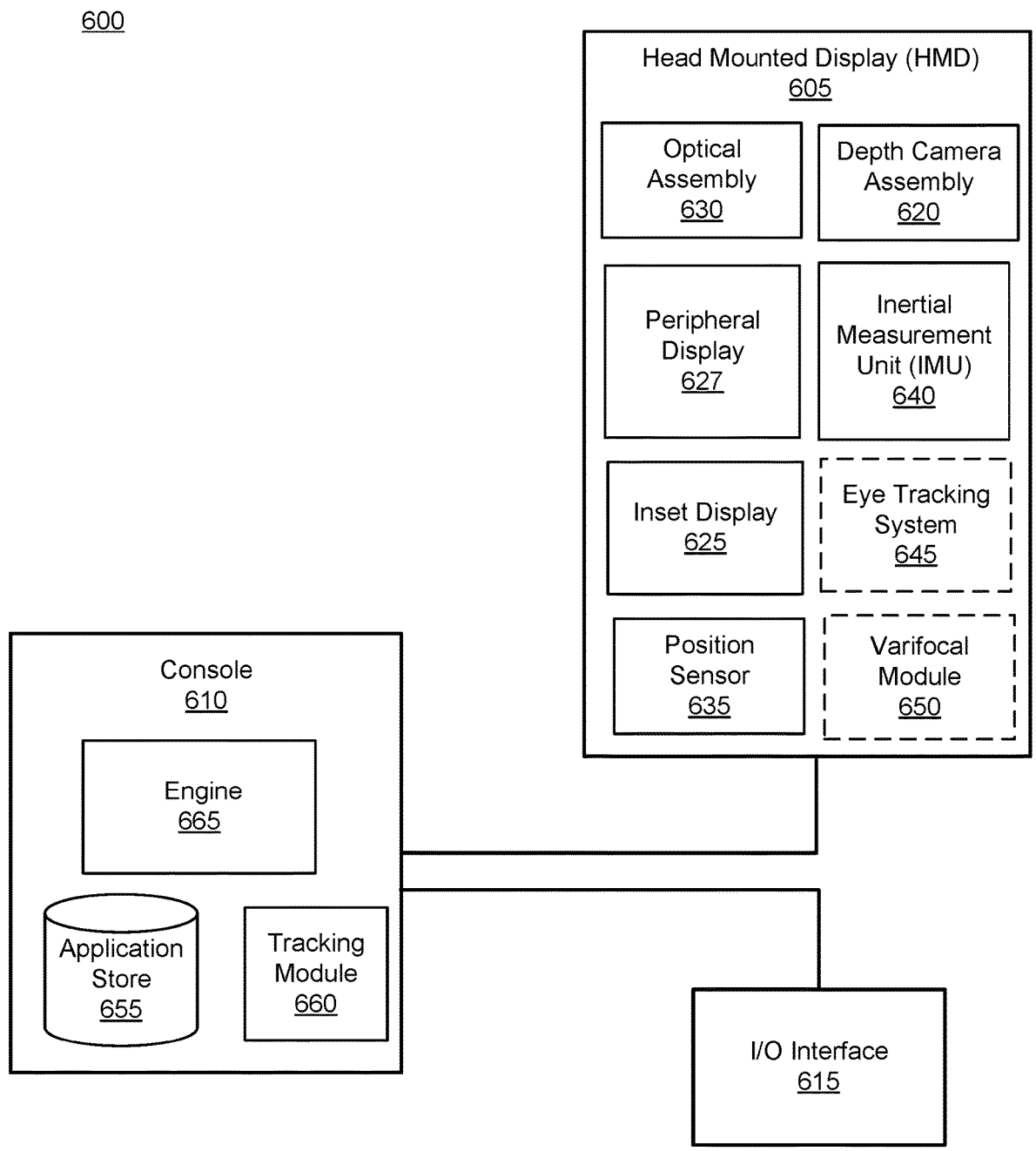
FIG. 6 is a block diagram of a HMD system in which a console operates, in accordance with an embodiment.

FIG. 6 is a block diagram of one embodiment of a HMD system 600 in which a console 610 operates. The HMD system 600 may operate in an artificial reality system. The HMD system 600 shown by FIG. 6 comprises a HMD 605 and an input/output (I/O) interface 615 that is coupled to the console 610. While FIG. 6 shows an example HMD system 600 including one HMD 605 and on I/O interface 615, in other embodiments any number of these components may be included in the HMD system 600. For example, there may be multiple HMDs 605 each having an associated I/O interface 615, with each HMD 605 and I/O interface 615 communicating with the console 610. In alternative configurations, different and/or additional components may be included in the HMD system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the HMD 605.

The HMD 605 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 605, the console 610, or both, and presents audio data based on the audio information. The HMD 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 605 may be the HMD 100 described above in conjunction with FIG. 1.

The HMD 605 includes a DCA 620, an inset display 625, a peripheral display 627, an optical assembly 630, one or more position sensors 635, an IMU 640, an optional eye tracking system 645, and an optional varifocal module 650. Some embodiments of the HMD 605 have different components than those described in conjunction with FIG. 6. Additionally, the functionality provided by various components described in conjunction with FIG. 6 may be differently distributed among the components of the HMD 605 in other embodiments.

The DCA 620 captures data describing depth information of a local area surrounding some or all of the HMD 605. The DCA 620 can compute the depth information using the data (e.g., based on a captured portion of a structured light pattern), or the DCA 620 can send this information to another device such as the console 610 that can determine the depth information using the data from the DCA 620.

The inset display 625 is an electronic display that displays two-dimensional or three-dimensional images to the user in accordance with data received from the console 610. In various embodiments, the inset display 625 comprises a single electronic display or multiple electronic displays (e.g., a display for each eye of a user). The inset display 625 is a high resolution display positioned along an optical axis of the optical assembly 630. The inset display 625 emits image light of a first polarization appropriately processed by the optical assembly 630. In some embodiments, the inset display 625 emits circularly polarized light of a first handedness, e.g., right handed circularly polarized light. Examples of the inset display 625 include: a LCD, an OLED display, an ILED display, an AMOLED display, a TOLED display, some other display, or some combination thereof. The electronic display 625 may be the embodiment of the inset display 310.

The peripheral display 627 is an electronic display that displays two-dimensional or three-dimensional images to the user in accordance with data received from the console 610. In various embodiments, the peripheral display 627 comprises a single electronic display or multiple electronic displays (e.g., a display for each eye of a user). A resolution of the peripheral display 627 is typically lower than that of the inset display 625. The peripheral display 627 is positioned in parallel with the inset display 625, e.g., behind the inset display 625, covering a much wider FOV than the inset display 625. The peripheral display 627 emits image light of a second polarization that is appropriately processed by the optical assembly 630. In some embodiments, the peripheral display 627 emits circularly polarized light of a second handedness opposite to the first handedness. For example, the peripheral display 627 emits left handed circularly polarized light. Examples of the peripheral display 627 include: a LCD, an OLED display, an ILED display, an AMOLED display, a TOLED display, some other display, or some combination thereof. The peripheral display 627 may be the embodiment of the peripheral display 315.

The optical assembly 630 magnifies image light received from the inset display 625 and the peripheral display 627, corrects optical errors associated with the image light, and presents the corrected image light to a user of the HMD 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the inset display 625 and the peripheral display 627 to be physically smaller, weigh less and consume less power than larger displays. Additionally, magnification may increase the field-of-view of the content presented by the inset display 625 and the peripheral display 627. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the inset display 625 and the peripheral display 627 for display is pre-distorted, and the optical assembly 630 corrects the distortion when it receives image light from the inset display 625 and the peripheral display 627 generated based on the content.

In accordance with embodiments of the present disclosure, the optical assembly 630 includes a MOA that combines (multiplexes) image light emitted from the inset display 625 and the peripheral display 627. The MOA of the optical assembly 630 may include a pair of optical elements that form a pancake lens assembly. The MOA of the optical assembly 630 folds the image light of the first polarization emitted from the inset display 625, and directly propagates the image light of the second polarization emitted from the peripheral display 627. Alternatively, the MOA of the optical assembly 630 includes at least one birefringent lens or at least one geometric phase lens. The MOA of the optical assembly 630 directs the combined image light to an eye-box of a user. In some embodiments, the optical assembly 630 includes the MOA 320.

The IMU 640 is an electronic device that generates data indicating a position of the HMD 605 based on measurement signals received from one or more of the position sensors 635 and from depth information received from the DCA 620. A position sensor 635 generates one or more measurement signals in response to motion of the HMD 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the HMD 605 relative to an initial position of the HMD 605. For example, the position sensors 635 include multiple accelerometers to measure translational motion (forward/back, up/down, left/right) and multiple gyroscopes to measure rotational motion (e.g., pitch, yaw, roll). In some embodiments, the position sensors 635 may represent the position sensors 135 of FIG. 1. In some embodiments, the IMU 640 rapidly samples the measurement signals and calculates the estimated current position of the HMD 605 from the sampled data. For example, the IMU 640 integrates the measurement signals received from the accelerometers over time to estimate a velocity vector and integrates the velocity vector over time to determine an estimated current position of a reference point on the HMD 605. Alternatively, the IMU 640 provides the sampled measurement signals to the console 610, which interprets the data to reduce error. The reference point is a point that may be used to describe the position of the HMD 605. The reference point may generally be defined as a point in space or a position related to the HMD's 605 orientation and position.

The IMU 640 receives one or more parameters from the console 610. The one or more parameters are used to maintain tracking of the HMD 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the HMD 605, the IMU 640 may be a dedicated hardware component. In other embodiments, the IMU 640 may be a software component implemented in one or more processors. In some embodiments, the IMU 640 may represent the IMU 130 of FIG. 1.

In some embodiments, the eye tracking system 645 is integrated into the HMD 605. The eye tracking system 645 determines eye tracking information associated with an eye of a user wearing the HMD 605. The eye tracking information determined by the eye tracking system 645 may comprise information about an orientation of the user's eye, i.e., information about an angle of an eye-gaze. In some embodiments, the eye tracking system 645 is integrated into the optical assembly 630. An embodiment of the eye-tracking system 645 may comprise an illumination source and an imaging device (camera).

In some embodiments, the varifocal module 650 is further integrated into the HMD 605. The varifocal module 650 may be coupled to the eye tracking system 645 to obtain eye tracking information determined by the eye tracking system 645. The varifocal module 650 may be configured to adjust focus of one or more images displayed on the electronic display 625, based on the determined eye tracking information obtained from the eye tracking system 645. In this way, the varifocal module 650 can mitigate vergence-accommodation conflict in relation to image light. The varifocal module 650 can be interfaced (e.g., either mechanically or electrically) with at least one of the inset display 625, the peripheral display 627, and at least one optical element of the optical assembly 630. Then, the varifocal module 650 may be configured to adjust focus of the one or more images displayed on the inset display 625 and/or the peripheral display 627 by adjusting position of at least one of the inset display 625, the peripheral display 627 and the at least one optical element of the optical assembly 630, based on the determined eye tracking information obtained from the eye tracking system 645. By adjusting the position, the varifocal module 650 varies focus of image light output from the inset display 625 and/or the peripheral display 627 towards the user's eye. The varifocal module 650 may be also configured to adjust resolution of the images displayed on the inset display 625 and/or the peripheral display 627 by performing foveated rendering of the displayed images, based at least in part on the determined eye tracking information obtained from the eye tracking system 645. In this case, the varifocal module 650 provides appropriate image signals to the inset display 625 and/or the peripheral display 627. The varifocal module 650 provides image signals with a maximum pixel density for the inset display 625 only in a foveal region of the user's eye-gaze, while providing image signals with lower pixel densities in other regions of the inset display 625 and/or regions of the peripheral display 627. In one embodiment, the varifocal module 650 may utilize the depth information obtained by the DCA 620 to, e.g., generate content for presentation on the inset display 625 and/or the peripheral display 627.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures IMU data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the HMD 605 for processing in accordance with information received from one or more of: the DCA 620, the HMD 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the HMD 605 or the I/O interface 615. Examples of applications include: gaming applications, conferencing applications, video playback applications, or other suitable applications.

The tracking module 660 calibrates the HMD system 600 using one or more calibration parameters and may adjust one or more calibration parameters to reduce error in determination of the position of the HMD 605 or of the I/O interface 615. For example, the tracking module 660 communicates a calibration parameter to the DCA 620 to adjust the focus of the DCA 620 to more accurately determine positions of structured light elements captured by the DCA 620. Calibration performed by the tracking module 660 also accounts for information received from the IMU 640 in the HMD 605 and/or an IMU 640 included in the I/O interface 615. Additionally, if tracking of the HMD 605 is lost (e.g., the DCA 620 loses line of sight of at least a threshold number of structured light elements), the tracking module 660 may re-calibrate some or all of the HMD system 600.

The tracking module 660 tracks movements of the HMD 605 or of the I/O interface 615 using information from the DCA 620, the one or more position sensors 635, the IMU 640 or some combination thereof. For example, the tracking module 650 determines a position of a reference point of the HMD 605 in a mapping of a local area based on information from the HMD 605. The tracking module 660 may also determine positions of the reference point of the HMD 605 or a reference point of the I/O interface 615 using data indicating a position of the HMD 605 from the IMU 640 or using data indicating a position of the I/O interface 615 from an IMU 640 included in the I/O interface 615, respectively. Additionally, in some embodiments, the tracking module 660 may use portions of data indicating a position or the HMD 605 from the IMU 640 as well as representations of the local area from the DCA 620 to predict a future location of the HMD 605. The tracking module 660 provides the estimated or predicted future position of the HMD 605 or the I/O interface 615 to the engine 655.

The engine 665 generates a 3D mapping of the area surrounding some or all of the HMD 605 (i.e., the "local area") based on information received from the HMD 605. In some embodiments, the engine 665 determines depth information for the 3D mapping of the local area based on information received from the DCA 620 that is relevant for techniques used in computing depth. The engine 665 may calculate depth information using one or more techniques in computing depth from structured light. In various embodiments, the engine 665 uses the depth information to, e.g., update a model of the local area, and generate content based in part on the updated model.

The engine 665 also executes applications within the HMD system 600 and receives position information, acceleration information, velocity information, predicted future positions, or some combination thereof, of the HMD 605 from the tracking module 660. Based on the received information, the engine 665 determines content to provide to the HMD 605 for presentation to the user. For example, if the received information indicates that the user has looked to the left, the engine 665 generates content for the HMD 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the HMD 605 or haptic feedback via the I/O interface 615.

In some embodiments, based on the eye tracking information (e.g., orientation of the user's eye) received from the eye tracking system 645, the engine 665 determines resolution of the content provided to the HMD 605 for presentation to the user on the inset display 625 and/or the peripheral display 627. The engine 665 provides the content to the HMD 605 having a maximum pixel resolution on the inset display 625 in a foveal region of the user's gaze, whereas the engine 665 provides a lower pixel resolution in other regions of the inset display 625 and/or regions of the peripheral display 627, thus achieving less power consumption at the HMD 605 and saving computing cycles of the console 610 without compromising a visual experience of the user. In some embodiments, the engine 665 can further use the eye tracking information to adjust where objects are displayed on the inset display 625 and/or the peripheral display 627 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical assembly comprising:
a mirrored surface in an optical series with a waveplate surface and a reflective polarizer surface, the mirrored surface receiving light of a first polarization and light of a second polarization, wherein the mirrored surface together with the waveplate surface and the reflective polarizer surface is configured to:
transform the light of the first polarization into a first portion of light of a third polarization,
transform the light of the second polarization into a second portion of the light of the third polarization, and
combine the first and second portions of the light of the third polarization.

2. The optical assembly of claim 1, wherein the light of the first polarization and the light of the second polarization comprise circularly polarized light of mutually opposite handedness.

3. The optical assembly of claim 1, wherein the light of the first polarization comprises right handed circularly polarized light and the light of the second polarization comprises left handed circularly polarized light.

4. The optical assembly of claim 1, wherein the first portion of the light of the third polarization and the second portion of the light of the third polarization include light having a polarization parallel to a transmission axis of a front optical element comprising the reflective polarizer surface.

5. The optical assembly of claim 1, further comprising:
a back optical element including the mirrored surface, the back optical element configured to:
transmit a defined amount of light incident on a surface of the back optical element, and
reflect a remaining amount of the light incident on the surface of the back optical element; and
a front optical element in optical series with the back optical element and positioned closer to an eye-box than the back optical element, the front optical element including the reflective polarizer surface, the front optical element configured to transmit toward the eye-box light received from the back optical element having a polarization direction parallel to a transmission axis of the front optical element.

6. The optical assembly of claim 5,
wherein the waveplate surface is positioned between the front optical element and the back optical element, the waveplate surface configured to:
in-couple polarized light; and
transform the in-coupled polarized light into output light having a polarization different than another polarization of the in-coupled polarized light.

7. The optical assembly of claim 6, wherein the waveplate surface is a quarter waveplate configured to transform the in-coupled light having circular polarization into the output light of linear polarization.

8. The optical assembly of claim 5, wherein the back optical element is configured to:
transmit approximately 50% of the light incident on the surface of the back optical element; and
reflect approximately 50% of the light incident on the surface of the back optical element.

9. The optical assembly of claim 5, wherein the back optical element is adjacent to an inset display emitting the light of the first polarization incident on the surface of the back optical element.

10. The optical assembly of claim 1, wherein an inset display is positioned along an optical axis of the optical assembly, and the inset display covers a first field-of-view (FOV) narrower than a second FOV covered by a peripheral display.

11. The optical assembly of claim 10, wherein:
the inset display has a first resolution and emits the light of the first polarization; and
the peripheral display has a second resolution and emits the light of the second polarization.

12. The optical assembly of claim 10, wherein the inset display includes a display surface emitting light and a circular polarizer polarizing the emitted light to form the light of the first polarization.

13. The optical assembly of claim 1, further comprising at least one birefringent element having a first focal length for the light of the first polarization and a second focal length longer than the first focal length for the light of the second polarization.

14. The optical assembly of claim 1, further comprising at least one geometric phase lens having a positive focal length for the light of the first polarization and a negative focal length for the light of the second polarization.

15. The optical assembly of claim 1, further comprising at least one Pancharatnam-Berry phase lens having a positive focal length for the light of the first polarization and a negative focal length for the light of the second polarization.

16. A method comprising:
receiving, at a mirrored surface in an optical series with a waveplate surface and a reflective polarizer surface, light of a first polarization and light of a second polarization;
transforming, by the mirrored surface together with the waveplate surface and the reflective polarizer surface, the light of the first polarization into a first portion of light of a third polarization;

transforming, by the mirrored surface together with the waveplate surface and the reflective polarizer surface, the light of the second polarization into a second portion of the light of the third polarization; and combining, by the mirrored surface together with the waveplate surface and the reflective polarizer surface, the first and second portions of the light of the third polarization.

17. The method of claim 16, further comprising:

transmitting a defined amount of light incident on a surface of a back optical element including the mirrored surface;

reflecting a remaining amount of the light incident on the surface of the back optical element; and transmitting, by a front optical element in optical series with the back optical element, light received from the back optical element having a polarization direction parallel to a transmission axis of the front optical element including the reflective polarizer surface.

18. The method of claim 17, further comprising:

in-coupling, by the waveplate surface positioned between the front optical element and the back optical element, polarized light received from the back optical element; and transforming, by the waveplate surface, the in-coupled polarized light into output light having a polarization different than another polarization of the in-coupled polarized light, the output light propagating toward the front optical element.

19. The method of claim 16, wherein the light of the first polarization and the light of the second polarization comprise circularly polarized light of mutually opposite handedness.

20. A display assembly comprising:

an inset display having a first resolution configured to emit image light of a first polarization;

a peripheral display having a second resolution configured to emit image light of a second polarization; and a mirrored surface in an optical series with a waveplate surface and a reflective polarizer surface, the mirrored surface receiving the image light of the first polarization and the image light of the second polarization, wherein the mirrored surface together with the waveplate surface and the reflective polarizer surface is configured to:

transform the image light of the first polarization into a first portion of image light of a third polarization, transform the image light of the second polarization into a second portion of the image light of the third polarization, and combine the first and second portions of the image light of the third polarization.

* * * * *